United States Patent [19]

Kagawa

[11] Patent Number: 4,895,777

[45] Date of Patent: Jan. 23, 1990

[54] SODIUM-SULFUR STORAGE BATTERY

[75] Inventor: Hiroshi Kagawa, Takatsuki, Japan

[73] Assignee: Yuasa Battery Co., Ltd., Osaka, Japan

[21] Appl. No.: 896,196

[22] Filed: Aug. 14, 1986

[30] Foreign Application Priority Data

Aug. 14, 1985 [JP] Japan .................. 60-179088

[51] Int. Cl.⁴ .................. H01M 4/36
[52] U.S. Cl. .................. 429/104; 429/209
[58] Field of Search .............. 429/104, 209; 29/623.1, 29/623.3

[56] References Cited

U.S. PATENT DOCUMENTS

| | | | |
|---|---|---|---|
| 3,116,172 | 12/1963 | Wilke et al. | 429/169 |
| 3,883,367 | 5/1975 | Chiku et al. | 429/104 |
| 4,048,389 | 9/1977 | Bubnick et al. | 429/101 |
| 4,091,151 | 5/1978 | Minck | 429/104 |
| 4,188,463 | 2/1980 | Arcuri, Jr. | 429/104 |
| 4,405,696 | 9/1983 | Fischer et al. | 429/104 |

Primary Examiner—John F. Niebling
Assistant Examiner—Steven P. Marquis
Attorney, Agent, or Firm—Bradford E. Kile

[57] ABSTRACT

A sodium-sulfur storage battery comprises a battery housing which functions as a positive current terminal collector, a solid electrolyte tube which is permeable to sodium ion and is disposed in the battery housing, and a positive electroconductive material, into which positive reactant is impregnated, disposed in a positive chamber between the solid electrolyte tube and the battery housing. The positive electroconductive material has a rugged part consisting of longitudinally extending concave and convex portions, which are formed by compression molding, at the inner surface thereof.

5 Claims, 1 Drawing Sheet

FIG.1
FIG.2
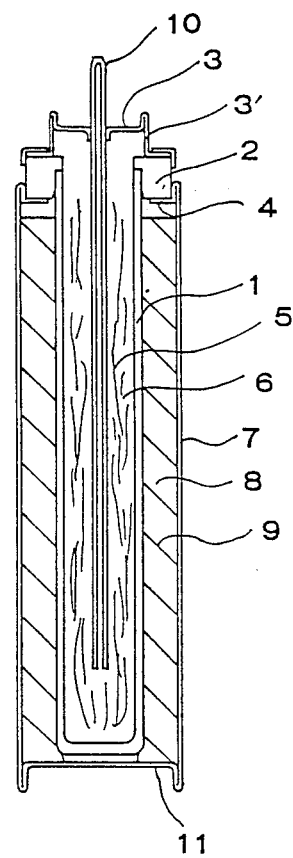
FIG.3
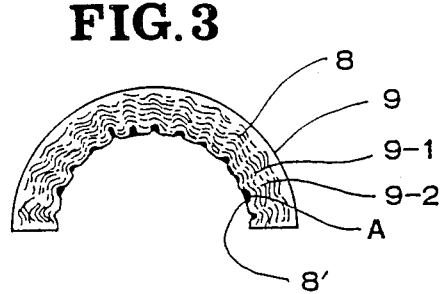

SODIUM-SULFUR STORAGE BATTERY

FIELD OF THE INVENTION

The present invention relates to a sodium-sulfur storage battery, and particularly to a structure of positive electroconductive material.

BACKGROUND OF THE INVENTION

In a sodium-sulfur storage battery as shown in FIG. 2, which is a schematic longitudinally sectional view, an alpha-alumina ring 2 is jointed with solder glass to an upper end of a solid electrolyte tube 1 made from material such as beta-alumunina or beta-dash-alumina which is permeable to sodium ion. A negative auxiliary cover 3' and a positive cover 4 are thermocompressively jointed to the upper and lower surfaces of the alpha-alumina ring 2, respectively. A negative chamber inside the solid electrolyte 1 is filled with metal fiber 5 such as stainless steel, iron, Nichrome, aluminum or the like. A negative current terminal collector 10, which is made from copper coated by stainless steel and is welded to the negative cover 3, is inserted into the central part of said negative chamber. Further, sodium functioning as negative reactant 6 is filled by a vacuum impregnation manner through the top of the negative current terminal collector 10 into said chamber. The top end of the terminal collector 10 is sealingly closed by a vacuum welding to keep the vacuum condition. A positive chamber is formed between the solid electrolyte tube 1 and a battery housing 7 welded to the positive cover 4. The housing 7 is made from metal having sufficient resistance to chemical and electro-chemical attack by molten sodium and sodium polysulfide, and functions as a positive current collector. Positive electro-conductive conductive material 9 made of graphite felt, into which positive reactant 8, i.e., sulfur, is impregnated, is disposed in the positive chamber. A bottom cover 11 is welded to the battery housing 7 to seal the chamber in a vacuum condition.

When the sodium-sulfur storage battery having said structure is discharged at a battery operation temperature of about 350° C., the negative reactant 6, i.e., sodium, in the solid electrolyte tube 1 is ionized and moves through the solid electrolyte tube 1 toward the positive electro-conductive material 9, and thus, reacts with the positive reactant 8, i.e., sulfur, in the positive electro-conductive material 9 to form discharge resultant subsutance $Na_2S_x$. When said resultant substance becomes $Na_2S_{2.7-3.0}$, the discharge finishes. In a subsequent charge, the discharge resultant subatance $Na_2S_x$ in the positive electroconductive material 9 changes and returns through $Na_2S_5$ to the sulfur, and the sulfur ion returns through the solid electrolyte tube 1 to the negative chamber.

Although the sulfur is deposited sufficiently and substantially uniformly in the positive electroconductive material 9 at the charging operation, subsequent to the discharging operation, this deposited sulfur does not sufficiently diffuse and it sticks to the outer surface of the solid electrolyte tube 1 to form an electric resistance layer, which prevents or restricts the movement of the sodium ion to the negative chamber. Thus, a charging voltage increases to a predetermined or intended maximum value of about 3.0 V before the sufficient charging is performed, which results in such a problem that it becomes harder to obtain intended or regulated battery capacity as charge-discharge cycles increase.

Positive electroconductive material overcoming said problem is disclosed in Japanese laid-open patent publication 56-35374, in which needle punching is performed perpendicularly or crosswise to a direction of fiber to improve electroconductivity. However, in a mass production of the batteries employing the above positive electroconductive material, there is large deviation or difference between characteristics of the batteries, and manufacturing is expensive. Further, a volume of space is large with respect to the volume of the electroconductive material, so that there is a high electric resistance, resulting in such a problem that the battery capacity and discharging mean voltage decrease as the charge-discharge cycles increase.

It is an object of the present invention to provide an improved sodium-sulfur storage battery, of which the deviation of characteristics is decreased and manufacturing cost is also reduced by using positive electroconductive material having excellent productivity.

SUMMARY OF THE INVENTION

The essence of the present invention is to provide a sodium-sulfur storage battery in which the positive electro-conductive material, into which positive reactant is impregnated, is divided into at least four parts by a longitudinal plane and a crosswise or transverse plane, and is formed at the inner surface of each part with a rugged or rough surface part consisting of longitudinally extending concave and convex portions, which are formed by compression.

The embodiments of invention are described by way of example, with reference to the accompanying drawings.

BRIEF DESCRIPTION OF THE DRAWINGS

FIG. 1 is a schematic perspective view of positive electroconductive material used in a sodium-sulfur storage battery according to the invention;

FIG. 2 is a schematic sectional view of a typical sodium-sulfur storage battery; and FIG. 3 is a schematic cross sectional view of the positive electroconductive material of FIG. 1.

DESCRIPTION OF THE PREFERRED EMBODIMENT

Referring to FIG. 1, positive electroconductive material 9 used in a sodium-sulfur storage battery has a cylindrical form as a whole and is divided into four parts by a substantially central longitudinal plane and a substantially central transverse plane. The positive electroconductive material 9 is formed by compression molding, and a rough inner surface part A consisting of longitudinally extending concave and convex portions is formed at the inner surface thereof by the molding. According to the embodiment of the invention, an outer layer of graphite felt which is 10 mm in thickness, 110 mm in width and 190 mm in length is laid over an inner layer of graphite felt which is 5 mm in thickness, 110 mm in width and 190 mm in length, into the material having an outer diameter of 69 mm, inner diameter 50 mm and length of 190 mm by the compression molding after positive reactant 8, i.e., sulfur of 185 g (grams) is impregnated into them. Since said two layers of the graphite felt of same width are laid over each other and compressively molded into an arcuate partial cylindrically shape to form the electroconductive material 9, a rough inner part A is automatically formed on the inner surface by said compression molding due to the wrinkle caused by the widthwise compression of 31 mm, and the material 9 has a cross section as shown in FIG. 3. In this connection, it will be seen from FIG. 3 that the inner cylindrical surface 8' has been forshortened or dimensionally compressed during forming as compared with the longer outer peripheral surface. According the interior surface becomes crinkled or roughed with irregularly shaped longitudinal extending concave and convex portions as shown in FIGS. 1 and 3. In FIG. 3, weakly compressed portions 9-1 and strongly compressed portions 9-2, which are alternately located in a circumferential direction, are formed in the positive electroconductive material 9, so that the electric resistance can be increased at the inner surface. According to this structure, the sulfur deposited at the charging operation, diffuses largely in the outer portion of the positive electroconductive material 9 as indicated at 8 in FIG. 3, and the sulfur starts to be deposited at the concave portions of the rugged part A, as indicated at 8' in FIG. 3, after the charge progresses to some extent, so that the surface of the solid-electrolyte tube 1 (FIG. 1) is covered only by a small amount of the sulfur.

An investigation has been performed with respect to the relation among the charge-discharge cycles, battery capacity and maximum voltage at the discharging operation for the battery of the invention having said structures and known battery of said needle punching type without the rugged portion A. The results are as shown in the following table 1.

TABLE 1

| CHARGE-DISCHARGE CYCLES | TESTED ITEMS | SORTS OF BATTERY | |
|---|---|---|---|
| | | BATTERY of INVENTION | KNOWN BATTERY |
| 1 cycle | Battery Capacity | 369 Ah | 370 Ah |
| | Max. Voltage | 1.901 V | 1.901 V |
| 50 cycles | Battery Capacity | 361 Ah | 340 Ah |
| | Max. Voltage | 1.895 V | 1.854 V |
| 100 cycles | Battery Capacity | 363 Ah | 300 Ah |
| | Max. Voltage | 1.897 V | 1.798 V |

As apparent from the table 1, both of the battery of the invention and the known battery have similar battery capacities and maximum voltages at the initial stage of the charge-distance cycles. However, in the known battery, both the battery capacity and the maximum voltage decreases as the charge-discharge cycles increases. In the battery of the invention, the capacity and maximum voltage does not substantially changes, because a small amount of the sulfur is deposited on the surface of the solid electrolyte tube at the charging operation, and the charging capacity does not substantially change with respect to the battery capacity after the charge-discharge cycles increases.

In modifications, the rugged part can be formed by the compression molding of single positive electroconductive material, of which the inner surface is longer in width than the outer peripheral length of the solid electrolyte tube or by the compression molding of the single positive electroconductive material of which outer surface is longer in width than the inner peripheral length of the battery housing.

According to the invention, as described hereinabove, since the electroconductive material has the rugged part at the inner surface, the charging capacity does not decreases with respect to the battery capacity after the charge-discharge cycles increases, and thus, the sodium-sulfur storage battery can has excellent characteristics.

Although the foregoing invention has been described in some details by way of illustration and example for purposes of clarity of understanding, it will be obvious that certain changes and modifications may be practiced within the scope of the appended claims.

What is claimed is:

1. A sodium-sulfur storage battery comprising:
   a battery housing which functions as a positive current terminal collector;
   a solid electrolyte tube which is permeable to sodium ions and is disposed in the battery housing; and
   a positive electroconductive material, impregnated with a positive reactant, disposed in a positive chamber between said solid electrolyte tube and said battery housing, said positive electroconductive material having an rough interior surface part circumferentially composed of longitudinally extending circumferentially alternating concave and convex portions, which are formed by compression during arcuate molding of the electroconductive material.

2. A sodium-sulfur storage battery of claim 1 wherein said positive electroconductive material is divided into at least four parts by a longitudinal plane and a transverse plane.

3. A sodium-sulfur storage battery of claim 1 or 2 wherein said electroconductive material is formed by compression molding of a single graphite felt, of which the inner surface dimension is greater in width than the outer peripheral dimension of the solid electrolyte tube.

4. A sodium-sulfur storage battery of claim 1 or 2 wherein said electroconductive material is formed by compression molding of a single graphite felt, of which the outer surface dimension is greater in width than the inner peripheral dimension of the battery housing.

5. A sodium-sulfur storage battery of claim 1 or 2 wherein said electroconductive material is formed by compression molding of an inner layer of graphite felt and an outer layer of graphite felt of equal dimensions into a partial cylindrical shape.

* * * * *